US007083888B2

(12) United States Patent
Kudo et al.

(10) Patent No.: US 7,083,888 B2
(45) **Date of Patent: *Aug. 1, 2006**

(54) EXTERNAL ADDITIVE FOR ELECTROSTATICALLY CHARGED IMAGE DEVELOPING TONER

(75) Inventors: Muneo Kudo, Annaka (JP); Masaki Tanaka, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 84 days.

This patent is subject to a terminal disclaimer.

(21) Appl. No.: 09/946,330

(22) Filed: Sep. 6, 2001

(65) Prior Publication Data

US 2002/0055051 A1 May 9, 2002

(30) Foreign Application Priority Data

Sep. 7, 2000 (JP) ....................................... 2000-272172

(51) Int. Cl.
*G03G 9/097* (2006.01)
*C04B 14/04* (2006.01)

(52) U.S. Cl. .............................. 430/108.15; 430/108.2; 430/108.21; 430/108.3; 430/108.7; 106/490; 106/491; 428/405

(58) Field of Classification Search ............ 430/108.11, 430/108.15, 108.2, 108.3, 108.7, 108.21, 430/108.24; 428/404, 405; 106/490, 491
See application file for complete search history.

(56) References Cited

U.S. PATENT DOCUMENTS

| | | | | | |
|---|---|---|---|---|---|
| 4,868,084 | A | * | 9/1989 | Uchide et al. | 430/108.24 |
| 4,891,394 | A | * | 1/1990 | Savin | 523/442 |
| 5,447,815 | A | * | 9/1995 | Kato et al. | 430/126 |
| 5,981,131 | A | * | 11/1999 | Hirama et al. | 430/108.3 |
| 6,316,155 | B1 | | 11/2001 | Kudo et al. | 430/108.3 |
| 6,420,456 | B1 | * | 7/2002 | Koski | 523/213 |

FOREIGN PATENT DOCUMENTS

| | | | | | |
|---|---|---|---|---|---|
| EP | 588328 | A2 | * | 3/1994 | 430/108.7 |
| EP | 1035450 | A2 | * | 9/2000 | |
| JP | 2-287459 | | * | 11/1990 | |
| JP | 5-119519 | | * | 5/1993 | |
| JP | 5-224456 | | * | 9/1993 | |
| JP | 5-232745 | | * | 9/1993 | |
| JP | 7-027272 | B2 | * | 3/1995 | |
| JP | 8-016801 | B2 | * | 2/1996 | |
| JP | 9-152738 | | * | 6/1997 | |
| JP | 9-311499 | | * | 12/1997 | |
| JP | 10-221878 | | * | 8/1998 | |
| JP | 10-288856 | | * | 10/1998 | |

OTHER PUBLICATIONS

Noll, Walter, Chemistry and Technology of Silicones Academic Press, NY (1968), p. 3.*

Japanese Patent Office Machine–Assisted Translation of JP 5–119519 (Pub 5/93).*

Grant, R. et al, Eds. *Grant and Hackh's Chemical Dictionary*, 5th Edition McGraw–Hill Book Company, NY (1987), pp. 22 and 24.*

Japanese Patent Office machine–assisted translation of JP 09–152738 (pub. Jun. 1997).*

Thomas–Derwent English–language translation of JP 05–119519 A (pub. May 1993).*

USPTO English–language translation of JP 09–152738 (pub. Jun. 1997).*

* cited by examiner

*Primary Examiner*—Janis L. Dote
(74) *Attorney, Agent, or Firm*—Oblon, Spivak, McClelland, Maier & Neustadt, P.C.

(57) ABSTRACT

An external additive for electrostatically charged image developing toner is provided. The additive includes spherical hydrophobic fine silica particles having primary particles with a particle diameter of from 0.01 to 5 μm and having been treated with a compound selected from the group consisting of a quaternary ammonium salt compound, a fluoroalkyl-group- or fluoroalkenyl-group- containing betaine compound and a silicone oil. The fine silica particles fulfill conditions (i) and (ii), as described in the disclosure. The external additive does not react or has no interaction with an organic photoreceptor and therefore change in quality does not occur or the photoreceptor is not scraped. Furthermore, it has a good flowability and therefore adhesion of a toner to the photoreceptor does not occur.

11 Claims, No Drawings

EXTERNAL ADDITIVE FOR ELECTROSTATICALLY CHARGED IMAGE DEVELOPING TONER

BACKGROUND OF THE INVENTION

1. Field of the Invention

The present invention relates to an external additive for an electrostatically charged image developing toner which is used to develop an electrostatically charged image in electrophotography, electrostatic recording, and the like, and particularly it relates to an external additive for a toner with a small particle size used for obtaining images of high quality.

2. Description of the Prior Arts

Dry developers used in electrophotography and so forth are generally classified into a one-component developer which consists of a toner prepared by dispersing a coloring agent in a binding resin and a two-component developer consisting of the toner and a carrier. In using these developers in copying operation, the developers are required to have good flowability, anti-caking property, fixing property, electrification property, and cleaning properties so as to be adapted to the process. In order to improve especially the flowability, anti-caking property, fixing property, and cleaning properties, fine inorganic powder is frequently added to the toner.

However, the inorganic fine powder may greatly affect charging. For example, in the case of fine silica powder commonly used, it has so strong a negative polarity that it makes negatively chargeable toners too highly charged especially in a low-temperature and low-humidity environment, and on the other hand it takes up moisture to become low chargeable in a high-temperature and high-humidity environment, and hence the fine silica powder has such a problem that a great difference in chargeability may result between the both. As the result, it may make image density poorly reproducible and cause background fog. Also, the dispersibility of the inorganic fine particles may greatly affect toner properties. Non-uniform dispersion of a toner may not give any desired flowability or anti-caking property, or may result in insufficient cleaning property, causing adhesion of the toner on a photoreceptor and image defect in black spots.

For the purpose of making improvements on these points, the use of inorganic fine powders having been surface-treated to make its particle surfaces hydrophobic is proposed in variety. For example, Japanese Laid-open Publication (Kokai) Nos. 46-5782 (JP46-5782A), 48-47345 (JP48-47345A) and 48-47346 (JP48-47346A) disclose hydrophobic treatment of particle surfaces of fine silica powders. However, merely making use of the inorganic fine powders can not necessarily bring about any satisfactory effects.

Japanese Laid-open Publication (Kokai) Nos. 49-42354 (JP49-42354A) and 55-26518 (JP55-26518A) also disclose treating a powder of silica or the like with a silicone oil. However, a toner to which the surface-treated silica has been added may have low anti-offset properties to cause a problem that the toner adheres to heating rollers to contaminate the subsequent copies. This occurs because, when a wax added to the toner to impart releasability thereto and the fine silica powder treated with a silicone-oil become mixed, the wax builds up in viscosity to damage the releasing effect.

As methods of relaxing the strong negative chargeability of fine silica powder, it is known to treat particle surfaces of fine silica powder with an amino-modified silicone oil (Japanese Laid-open Publication (Kokai) No. 64-73354 (JP64-73354A)), to treat particle surfaces of fine silica powder with an aminosilane and/or an amino-modified silicone oil (Japanese Laid-open Publication (Kokai) No. 1-237561 (JP1-237561A)), to treat particle surfaces of fine silica powder with a quaternary ammonium salt (Japanese Laid-open Publication (Kokai) No. 5-100471 (JP5-100471A)), and to treat particle surfaces of fine silica powder with an amphoteric surface-active agent (Japanese Laid-open Publication (Kokai) No. 6-95426 (JP6-95426A)). Treatment with these compounds can keep the negatively chargeable toners from becoming too highly charged, but can not sufficiently lessen the environmental dependency inherent in the static electricity itself. In other words, it can somewhat keep the negatively chargeable toners from becoming too highly charged after their long-time use in a low-temperature and low-humidity environment, but can not still lessen the environmental dependency because such neutralization of electric charges may similarly occur also in long-time use in a high-temperature and high-humidity environment. Also, when a silicone oil is used as a treating agent, it has so high a viscosity as to cause aggregation of silica particles at the time of treatment, resulting in a poor powder flowability.

In addition, when an organic photoreceptor or a toner with a smaller particle size is used to improve image quality, the use of the inorganic fine powder does not give sufficient performance. The organic photoreceptor has a softer surfaces and a higher reactivity than an inorganic photoreceptor; therefore, the life of the organic photoreceptor is liable to become shorter. Such an organic photoreceptor is liable to change in quality or to be abraded at its surface because of the inorganic fine powder added to the toner. When a toner with a smaller particle size is used, the toner is low in flowability as compared to toners with a conventional particle size. Therefore, the inorganic powder has to be used in a large quantity, and thereby the inorganic fine powder may have caused the toner to adhere to the photoreceptor.

SUMMARY OF THE INVENTION

Thus, it is an object of the present invention to provide an external additive comprising fine silica particles which do not react with or have any interaction with an organic photoreceptor and hence do not cause any change in quality or abrasion of the photoreceptor and which have good flowability and therefore do not cause any adhesion of toner to the photoreceptor.

The inventors of the present invention studied earnestly to solve the problems stated above and have discovered that the problems can be solved by an external additive for electrostatically charged image developing toner, comprising spherical hydrophobic fine silica particles having primary particles with a particle diameter of from 0.01 to 5 μm and having been treated with a compound selected from the group consisting of a quaternary ammonium salt compound, a fluoroalkyl group- or fluoroalkenyl group- containing betaine compound and a silicone oil, said fine silica particles fulfilling the following conditions (i) and (ii):

(i) when an organic compound which is liquid at room temperature and has a dielectric constant of from 1 to 40 F/m and fine silica particles are mixed in a weight ratio of 5:1 and shaken, the fine silica particles disperse uniformly in the organic compound, and (ii) the quantity of primary particles which remain when methanol is evaporated under heating by means of an evaporator from a dispersion prepared by dispersing the fine silica particles in methanol and thereafter the particles are held at a temperature of 100° C. for 2 hours, represents at least 20% of the quantity of primary particles which were originally present.

The surface-treated fine silica particles used in the present invention can provide good results with respect to the objects and effects of the present invention because their surfaces have been made highly hydrophobic, any reactive groups such as silanol groups do not remain thereon and also the particles are highly dispersible, low aggregative and well flowable.

DETAILED DESCRIPTION OF THE PREFERRED EMBODIMENTS

The hydrophobic fine silica particles used in the present invention are spherical hydrophobic fine silica particles of which primary particles have an average of 0.01 to 5 μm, having been obtained by the step of introducing an $R^2SiO_{3/2}$ unit (wherein $R^2$ represents a substituted or unsubstituted monovalent hydrocarbon group having 1 to 20 carbon atoms) onto the surfaces of hydrophilic fine silica particles comprising an $SiO_2$ unit to produce first hydrophobic silica particles; and introducing an $R^1_3SiO_{1/2}$ unit (wherein $R^1$s may be the same or different and each represent a substituted or unsubstituted monovalent hydrocarbon group having 1 to 6 carbon atoms) onto the surfaces of the first hydrophobic fine silica particles.

An example of a more specific method of producing the hydrophobic fine silica particles is as described below.

The hydrophobic fine silica particles can be produced by a process comprising:

the step of subjecting one or more compounds selected from the group consisting of a tetrafunctional silane compound represented by the general formula (I):

$$Si(OR^3)_4 \qquad (I)$$

(wherein $R^3$'s may be the same or different and each represent a monovalent hydrocarbon group having 1 to 6 carbon atoms) or a partial hydrolysis-condensation product thereof, to hydrolysis and condensation in a mixed solvent of a hydrophilic organic solvent such as methanol, ethanol and the like, water and a basic compound such as ammonia and an organic amine, to obtain a hydrophilic fine silica particle dispersion;

the step of adding water to the hydrophilic fine silica particle dispersion thus obtained, distilling of the hydrophilic solvent to convert the dispersion into an aqueous dispersion to completely hydrolyzing alkoxyl groups remaining on the surfaces of the fine particles;

the step of adding to the aqueous hydrophilic fine silica particle dispersion, one or more compounds selected from the group consisting of a trifunctional silane compound represented by the general formula (II):

$$R^2Si(OR^4)_3 \qquad (II)$$

(wherein $R^2$ represents a substituted or unsubstituted monovalent hydrocarbon group having 1 to 20 carbon atoms, and $R^4$'s may be the same or different and each represent a monovalent hydrocarbon group having 1 to 6 carbon atoms) and a partial hydrolysis-condensation product thereof, to coat the surfaces of the hydrophilic fine silica particles with it to obtain a first hydrophobic fine silica particle in an aqueous dispersion;

the step of adding a ketone solvent to said first hydrophobic fine silica particle aqueous dispersion followed by distilling off water to thereby convert the aqueous hydrophobic fine silica particle dispersion into a hydrophobic fine silica particle ketone solvent dispersion, and the step of adding to the hydrophobic fine silica particle ketone solvent dispersion at least one compound selected from the group consisting of a silazane compound represented by the general formula (III):

$$R^1_3SiNHSiR^1_3 \qquad (III)$$

(wherein $R^{1}$'s may be the same or different and each represent a substituted or unsubstituted monovalent hydrocarbon group having 1 to 6 carbon atoms), and a monofunctional silane compound represented by the general formula (IV):

$$R^1_3SiX \qquad (IV)$$

(wherein $R^{1}$'s are as defined in the general formula (III), and X represents a hydroxyl group or a hydrolyzable group) to permit the compound to react with silanol groups remaining on the fine silica particles, thereby the silanol groups being triorganosilylated, to enhance the hydrophobic nature of the fine silica particles.

Specific examples of the tetrafunctional silane compound represented by the general formula (I) include tetraalkoxysilanes such as tetramethoxysilane, tetraethoxysilane, tetraisopropoxysilane and tetrabutoxysilane. Specific examples of the partial hydrolysis-condensation product of the tetrafunctional silane compound represented by the general formula (I) include methyl silicate and ethyl silicate. Any of these may be used singly or in combination of two or more.

There are no particular limitations on the hydrophilic organic solvent so long as it dissolves the compound of the general formula (I) or partial hydrolysis-condensation product and the water. It includes alcohols, cellosolves such as methyl cellosolve, ethyl cellosolve, butyl cellosolve and cellosolve acetate, ketones such as acetone and methyl ethyl ketone, and ethers such as dioxane and tetrahydrofuran. Preferred are alcohols. The alcohols include alcohol solvents represented by the general formula (V):

$$R^6OH \qquad (V)$$

(wherein $R^6$ represents a monovalent hydrocarbon group having 1 to 6 carbon atoms). Specific examples include methanol, ethanol, isopropanol and butanol. The particle diameter of fine silica particles formed increases with increase in the number of carbon atoms of an alcohol used, and hence it is desirable to select the type of an alcohol in accordance with the intended particle diameter of fine silica particles.

The above basic substance include ammonia, dimethylamine and diethylamine, and preferably ammonia. Any of these basic compounds may be dissolved in water in a necessary quantity and thereafter the resultant aqueous solution (basic water) may be mixed with the hydrophilic organic solvent.

The water used here may preferably be in an amount of from 0.5 to 5 moles per mole of the silane compound of the general formula (I) or its partial hydrolysis-condensation product. The water and the hydrophilic organic solvent may preferably be in a ratio of from 0.5 to 10 in weight ratio. The basic substance may preferably be in an amount of from 0.01 to 1 mole per mole of the silane compound of the general formula (I) or its partial hydrolysis-condensation product.

The hydrolysis and condensation of the tetrafunctional silane compound of the general formula (I) is carried out by a well-known process in which the tetrafunctional silane compound of the general formula (I) is added dropwise in a mixture of the water and the hydrophilic organic solvent containing a basic substance.

The dispersion medium of the hydrophilic fine silica particle mixed-solvent dispersion may be converted into water by, e.g., a process of adding water to the dispersion and evaporating the hydrophilic organic solvent (this process may optionally be repeated). The water added here may preferably be used in a 0.5-fold to 2-fold amount, and preferably about 1-fold amount, in weight ratio based on the total weight of the hydrophilic organic solvent used and alcohol formed.

As specific examples of the trifunctional silane compound represented by the general formula (II), it may include trialkoxysilanes such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane and hexyltrimethoxysilane. Partial hydrolysis-condensation products of these may also be used. Any of these may be used alone or in combination of two or more.

The trifunctional silane compound represented by the general formula (II) may be added in an amount of from 1 to 0.001 moles, and preferably from 0.1 to 0.01 moles, per mole of the $SiO_2$ unit that the hydrophilic fine silica particles used contain.

The dispersion medium of the aqueous fine silica particle dispersion may be converted into a ketone solvent from the water, by a process of adding a ketone solvent to the dispersion and evaporating the water (this process may optionally be repeated as necessary). The ketone solvent added here may preferably be used in a 0.5-fold to 5-fold amount, and preferably about 1- to 2-fold amount, in weight ratio based on the weight of the hydrophilic fine silica particles used. As specific example of the ketone solvent used here, it may include methyl ethyl ketone, methyl isobutyl ketone and acetyl acetone. Preferred is methyl ethyl ketone.

As specific examples of the silazane compound represented by the general formula (III), it may include hexamethyldisilazane. As specific examples of the monofunctional silane compound represented by the general formula (IV), it may include monosilanol compounds such as trimethylsilanol and triethylsilanol, monochlorosilanes such as trimethylchlorosilane and triethylchlorosilane, monoalkoxysilanes such as trimethylmethoxysilane and trimethylethoxysilane, monoaminosilanes such as trimethylsilyldimethylamine and trimethylsilyldiethylamine and monoacyloxysilanes such as trimethylacetoxysilane. Any of these may be used alone or in combination of two or more.

These may each be used in an amount of from 0.1 to 0.5 mole, and preferably from 0.2 to 0.3 mole weight, per mole of the $SiO_2$ unit that the hydrophilic fine silica particles used contain.

The hydrophobic fine silica particles thus produced can be obtained in the form of a powder by a conventional method.

The particle diameter of the hydrophobic silica particles ranges from 0.01 to 5 μm, preferably 0.05 to 0.5μm, from the viewpoint of improving flowability, anti-caking property and fixing property and reducing adverse influence on a photoreceptor. If the particle diameter is smaller than 0.01 μm, the developer exhibits poor flowability, anti-caking property and fixing property due to aggregation. Particle diameters larger than 5 μm may disadvantageously cause a photoreceptor to be changed in quality or scraped, or may cause lowering of the toner adhesion to the photoreceptor.

The hydrophobic fine silica particles described above are surface-treated with a treating agent selected from a quaternary ammonium salt compound, a fluoroalkyl-group- or fluoroalkenyl-group- containing betaine compound and a silicone oil.

The quaternary ammonium salt compound used in the present invention may be exemplified by a compound represented by the following general formula (VI) and a bipyridyl compound formed by dimerization of the compound of the following general formula (VII):

$$R^7R^8R^9R^{10}N^+X \qquad (VI)$$

wherein $R^7$, $R^8$, $R^9$ and $R^{10}$ may be the same or different and each represent a substituted or unsubstituted monovalent hydrocarbon group having 1 to 20 carbon atoms, and X represents a monovalent anion.

(VII)

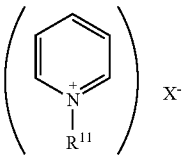

wherein $R^{11}$ may be the same or different and represents a substituted or unsubstituted monovalent hydrocarbon group having 1 to 20 carbon atoms, and X represents a monovalent anion.

The quaternary ammonium salt compound may more specifically be exemplified by compounds such as benzyltriethylammonium chloride, tetramethylammonium chloride, benzyltrimethylammonium chloride, benzyldimethylphenylammoniuni chloride, benzyldimethyltetradecylammonium chloride, phenyltrimethylammonium chloride, benzyltriethylammonium 4-hydroxy-1-naphthalene sulfonate and 1,1'-dioctadecyl-4,4'-bipyridium dibromide. Of these, preferred compounds are benzyltriethylammonium chloride and benzyltriethylarnmonium 4-hydroxy-1-naphthalene sulfonate.

The fluoroalkyl-group- or fluoroalkenyl-group- containing betaine compound used in the present invention may be exemplified by a compound represented by the following general formula (VIII):

(VIII)

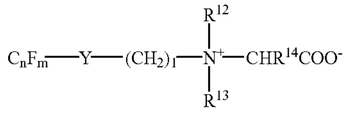

wherein $C_nF_m$— represents a fluoro alkyl group or a fluoro alkenyl group, n is an integer of 1 to 20 and m is 2n+1 or 2n−1; 1 is an integer of 0 to 10; $R^{12}$ and $R^{13}$ maybe the same or different and each represent a substituted or unsubstituted monovalent hydrocarbon group having 1 to 20 carbon atoms; $R^{14}$ represents hydrogen or a substituted or unsubstituted monovalent hydrocarbon group having 1 to 10 carbon atoms; Y represents a single bond, or represents a group selected from —O—, a phenylene group, —$SO_2$—, —CO—, —$NR^{15}$ (where $R^{15}$ has the same definition as $R^{14}$) or a divalent group formed by combination of two or more groups selected from these.

The fluoroalkyl-group- containing betaine compound may more specifically be exemplified by compounds such as $C^8F_{17}N^+(CH_3)_2CH_2COO^-$, $C_{10}F_{21}N^+(CH_3)_2CH_2COO^-$ and $C_{12}F_{25}N^+(CH_3)_2CH_2COO^-$. Preferred is $C_8F_{17}N^+(CH_3)_2CH_2COO^-$.

The silicone oil used in the present invention may be exemplified by a silicone oil or a modified silicone oil represented by the general formula (IX):

(IX)

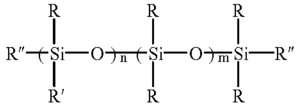

wherein R's each represent an alkyl group having 1 to 3 carbon atoms; R' independently represents an alkyl group, a halogenated alkyl group, a phenyl group, a substituted phenyl group or a group represented by the formula (X):

$$—R^7—N(R^8)(R^9) \quad (X)$$

wherein $R^7$ represents an alkylene group or a phenylene group; $R^8$ and $R^9$ may be the same or different and each represent a hydrogen atom, an alkyl group, an aryl group or an aminoalkyl group; R"'s each represent an alkyl group or alkoxyl group having 1 to 3 carbon atoms or a group having the formula (X); and n and m each represents an integer of 0 to 10,000, provided that n and m are not 0 at the same time.

In the general formula (IX), the alkyl group represented by R may include a methyl group, an ethyl group, a n-propyl group and an isopropyl group. The halogenated alkyl group may include, e.g., a 3,3,3-trifluoropropyl group. The substituted phenyl group may include, e.g., a chlorophenyl group. The alkyl group represented by R" may include those exemplified in respect of R, and the alkoxyl group may include a methoxyl group, an ethoxyl group, a n-propoxyl group and an isopropoxyl group.

As specific examples of the silicone oil represented by the general formula (IX), it may include dimethylsilicone oil, and methylphenylsilicone oil. In particular, dimethylsilicone oil is preferred.

The modified silicone oil includes, e.g., alkyl-modified silicone oils substituted with an ethyl group or a propyl group and aminosilicone oils, and it may preferably be an aminosilicone oil. The aminosilicone oil is a silicone oil into which an amino group has been introduced.

In the formula (X), the alkylene group represented by $R^7$ may include a methylene group, an ethylene group and a trimethylene group. The alkyl group represented by $R^8$ and $R^9$ may include a methyl group, an ethyl group and a propyl group; the aryl group may include, e.g., a phenyl group; and the alkylamino group may include an aminoethyl group and an aminopropyl group.

As specific examples of the aminosilicone oil, it may include products commercially available under the trade names KF393, KF859, KF860, KF861, KF864 and KF865 (products of Shin-Etsu Chemical Co., Ltd.).

As a method of surface-treating the hydrophobic fine silica particles with the quaternary ammonium salt compound or fluoroalkyl-group- or fluoroalkenyl-group- containing betaine compound, the quaternary ammonium salt compound or fluoroalkyl-group- or fluoroalkenyl-group-containing betaine compound may be dissolved or dispersed in a suitable solvent such as an alcohol e.g., methanol, and the solution or dispersion formed may be added to the hydrophobic fine silica particles to carry out surface-coating, followed by distillation-off of the solvent and drying. Here, there are no particular limitations on the order of adding the respective components. Alternatively, the quaternary ammonium salt compound or fluoroalkyl-group- or fluoroalkenyl-group- containing betaine compound may be added to the hydrophobic fine silica particle ketone solvent dispersion at the time of the production of hydrophobic fine silica particles to carry out surface-coating, followed by distillation off of the solvent and drying. If necessary, the dying may further be followed by pulverization and classification.

As methods for the treatment with the silicone oil, any known techniques may be used. For example, the fine silica powder and the silicone oil may directly be mixed by means of a mixer such as a Henschel mixer, or the silicone oil may be sprayed on the silica. As another method, the silicone oil may be dissolved or dispersed in a suitable solvent, and the solution or dispersion formed may be mixed with the silica, followed by removal of the solvent.

The treatment with the above quaternary ammonium salt compound, fluoroalkyl-group- or fluoroalkenyl-group- containing betaine compound or silicone oil may preferably be made in an amount of from 0.1 to 10% by weight, and more preferably from 0.5 to 3% by weight, based on the weight of the hydrophobic fine silica particles. Treatment with it in too large a quantity not only may cause aggregation of the hydrophobic fine silica particles to ensure no sufficient flowability, but also is economically disadvantageous. Treatment with it in too small a quantity may provide no sufficient charge quantity.

The external additive may preferably be added in an amount of 0.01 to 20 parts by weight, and more preferably 0.1 to 5 parts by weight, per 100 parts by weight of the toner. If the amount of the external additive is too small, the amount of the additive having adhered to the toner particles is too small to ensure any sufficient flowability. The use of external additive in too large an amount not only may affect the electrostatic property of the toner adversely, but also is economically disadvantageous.

The external additive may adhere to the toner particle surfaces in the state that the former adheres merely mechanically to the latter or the former is loosely fastened to the latter surfaces. The external additive may also cover the surfaces of toner particles entirely or may cover them partly. Also, the surface-treated fine inorganic-compound particles may be coated in a partly aggregate form, or may preferably be coated in the state of individually single-layer-coated particles.

Toner particles to which the external additive described above include known toners comprising mainly a binding resin and a coloring agent. To toners may optionally be added an electrostatic charge controller.

A toner for developing positive-electrostatically charged images to which the external additive according to the present invention has been added can be used as a one-component developer. Such a toner can be mixed with a carrier to produce a two-component developer. When the external additive is used for the two-component developer, it is possible not to add it to toner particles but to add it when blending the toner particles and a carrier, so as to cover the surfaces of the toner with the external additive. As the carrier, are used known ones such as an iron powder and the like or such powders of which surfaces are coated with a resin.

EXAMPLES

The present invention will be described below in detail by giving Examples and Comparative Examples. The present invention is not limited to the following Examples.

Example 1

Synthesis of Spherical Hydrophobic Fine Silica Particles (Step 1) In a 3-liter glass reaction vessel having a stirrer, a dropping funnel and a thermometer, 623.7 g of methanol, 41.4 g of water and 49.8 g of 28% ammonia water were added and then mixed. The resultant solution was set at 35° C., and 1,163.7 g of tetramethoxysilane and 418.1 g of 5.4% ammonia water began to be simultaneously added thereto with stirring the solution, where the former was dropped over 6 hours and the latter was dropped over a period of 4 hours. After the dropwise addition of the tetramethoxysilane, the solution was still continued to be stirred for 0.5 hour to carry out hydrolysis, and thus a suspension of fine silica particles was obtained. After the glass reaction vessel was fitted with an ester adapter and a condenser, the dispersion was heated to 60 to 70° C. to distil off 1,132 g of methanol, whereupon 1,200 g of water was added, followed by further heating to 70 to 90° C. to distil off 273 g of methanol. Thus, an aqueous suspension of fine silica particles was obtained.

(Step 2) To this aqueous suspension, 11.6 g of methyltrimethoxysilane (i.e., in an amount of 0.01 mole per mole of the tetramethoxysilane) was added dropwise over a period of 0.5 hour. After the dropwise addition, the dispersion was still stirred for 12 hours to surface-treat the fine silica particles.

(Step 3) To the dispersion thus obtained, 1,440 g of methyl isobutyl ketone was added, followed by heating to 80 to 110° C. to distil off methanol and water (1,163 g) over a period of 7 hours. To the resultant dispersion, 357.6 g of hexamethyldisilazane was added at room temperature, followed by heating at 120° C. to carry out reaction for 3 hours, so that the fine silica particles were trimethylsilylated. Thereafter, the solvent was distilled off under reduced pressure to obtain 477 g of spherical hydrophobic fine silica particles having an average particle diameter of 0.12 μm.

The silane-surface-treated fine silica particles thus obtained were tested in the following way.

Dispersibility Test

The fine silica particles are added to an organic compound which is liquid at room temperature, in an organic compound/silica particle weight ratio of 5:1, which are then shaken for 30 minutes by means of a shaker to mix them, and thereafter the state of dispersion is visually observed. An instance where the fine silica particles stand dispersed in their entirety and the whole is uniformly in the state of a slurry is indicated as "○"; an instance where the fine silica particles stand wetted with the organic compound in their entirety, but not dispersed in the organic compound partly and non-uniform, as "Δ"; and an instance where the fine silica particles stand not wetted with the organic compound and the both do not mix, as "X". The results are shown in Table 1.

Aggregation Accelerating Test (1) The fine silica particles are added to methanol in a methanol/silica particle weight ratio of 5:1, which are then shaken for 30 minutes by means of a shaker. Particle size distribution of the fine silica particles thus treated is measured with a laser diffraction scattering type particle size distribution analyzer (LA910, manufactured by Horiba Seisakusho).

(2) Next, from the fine-particle dispersion obtained in (1), the methanol is evaporated under heating, by means of an evaporator, and the particles are held at a temperature of 100° C. for 2 hours.

The fine silica particles thus treated are added in methanol, and then shaken for 30 minutes by means of a shaker. Thereafter, their particle size distribution is measured in the same manner as the above.

Percentage of remaining primary particles is determined on the basis of the particle size distribution measured in (1). Primary particle diameter is beforehand ascertained by electron-microscopic observation. The results are shown in Table 1.

Preparation of External Additive (Surface-treated Fine Silica Particles)

40 g of the hydrophobic fine silica particles obtained were added to 160 g of methanol, and the mixture obtained was shaked to effect dispersion. To the resultant dispersion, 0.4 g of benzyltriethylammonium chloride (treating agent A) was added and dissolved. Using an evaporator, the solvent methanol was removed, followed by drying to obtain fine silica particles treated with quaternary ammonium salt.

Measurement of Charge Quantity of Surface-treated Fine Silica Particles

The surface-treated fine silica particles obtained by the synthesis described above were added to a carrier, ferrite particles, so as for the former to be in a concentration of 0.5% by weight, which were then thoroughly blended to charge them triboelectrically. The charge quantity of this sample was measured with a blow-off powder charge quantity measuring instrument (Model TB-200, manufactured by Toshiba Chemical Co., Ltd.). The results are shown in Table 1.

Preparation of an External-additive-mixed Toner 96 parts by weight of a polyester resin having a Tg of 60° C. and a softening point of 110° C., and 4 parts by weight of Carmin 6BC (product by Sumika Color K.K.) as a coloring agent were melted and kneaded, ground and classified to obtain a toner having an average particle diameter of 7 μm. With 40 g of the toner, 1 g of the surface-treated spherical hydrophobic fine silica particles described above was mixed by means of a sample mill to obtain an external additive-mixed toner. Using the same, the degree of aggregation was evaluated in the following manner.

Measurement of Degree of Aggregation

The degree of aggregation is a value indicating the flowability of powder. It was measured using a powder tester manufactured by Hosokawa Micron K.K. and a threefold sieve which was fabricated by superimposing a 100-mesh sieve and subsequently a 60-mesh sieve on a 200-mesh sieve. The measurement is carried out by putting 5 g of a toner powder on the uppermost 60-mesh sieve of the threefold sieve, vibrating the threefold sieve for 15 seconds by applying a voltage of 2.5 V to the powder tester, and calculating the degree of aggregation in accordance with the following formula from the weight a (g) of powder remaining on the 60-mesh sieve, the weight b (g) of powder remaining on the 100-mesh sieve and the weight c (g) of powder remaining on the 200-mesh sieve.

$$\text{Degree of aggregation (\%)}=(a+b\times0.6+c\times0.2)\times100/5$$

The smaller the degree of aggregation, the better the flowability, while the larger the degree of aggregation, the worse the flowability The results are shown in Table 1.

Preparation of Developer 5 parts of an external-additive-mixed toner was blended with 95 parts of a carrier obtained by coating ferrite core particles having an average particle diameter of 85 μm with a polyblend of a perfluoroalkyl acrylate resin and an acrylic resin to prepare a developer. Using this developer, the charge quantity of toner and the adhesion of toner to photoreceptor were evaluated in the following way.

Toner Charge Quantity

The above developer was left for a day under conditions of high-temperature and high-humidity environment (30° C./90% RH) or low-temperature and low-humidity (10° C./15% RH), and thereafter well mixed to charge it triboelectrically. The charge quantity of each sample was measured under the like conditions with a blow-off powder charge quantity measuring instrument (Model TB-200, manufactured by Toshiba Chemical Co., Ltd.). The results are shown in Table 1.

Evaluation of Adhesion of Toner to Photoreceptor

The above developer was put in a two-component remodeled developing unit provided with an organic photoreceptor, and a 30,000-sheet print test was made. Here, the adhesion of toner to photoreceptor can be recognized as blank areas in solid images. The degree of blank areas is evaluated as "many" when they are 10 areas or more per $cm^2$, "few" when they are 1 to 9 areas per $cm^2$, and "none" when 0 area per $cm^2$. The results are shown in Table 1.

Example 2

467 g of spherical hydrophobic fine silica particles having an average particle diameter of 0.30 μm were obtained in the same manner as in Example 1, except that the temperature 35° C. for hydrolysis of tetramethoxysilane in synthesis of the spherical hydrophobic fine silica particles was changed to 20° C.

Using the hydrophobic fine silica particles thus obtained, evaluation was made in the same manner as in Example 1. The results are shown in Table 1.

Example 3

469 g of spherical hydrophobic fine silica particles having an average particle diameter of 0.09 μm was obtained in the same manner as in Example 1, except that the temperature 35° C. for hydrolysis of tetramethoxysilane in synthesis of the spherical hydrophobic fine silica particles was changed to 40° C.

Using the hydrophobic fine silica particles thus obtained, evaluation was made in the same manner as in Example 1. The results are shown in Table 1.

Examples 4 to 11

Evaluation was made in the same manner as in Example 1 except that as the treating agent for spherical hydrophobic fine silica particles the following treating agents were used in place of the benzyltriethylammonium chloride (treating agent A). The results are shown in Table 1.

Treating agent B: Tetramethylanimonium chloride
Treating agent C: Benzyltrimethylammonium chloride
Treating agent D: Benzyldimethylphenylammonium chloride
Treating agent E: Benzyldimethyltetradecylammonium chloride
Treating agent F: Phenyltrimethylanimonium chloride
Treating agent G: Benzyltriethylamnionium 4-hydroxy-1-naphthalene sulfonate
Treating agent H: 1,1'-Dioctadecyl-4,4'-bipyridium dibromide
Treating agent I: Fluoroalkylbetaine (available from K.K. Neosu; trade name: FUTARGENT 40S)
Treating agent J: Perfluoroalkyltrimethylammonium salt (available from Dainippon Ink & Chemicals, Incorporated; trade name: MEGAFAX-F150)
Treating agent K: Fluoroalkylanmionium iodide (available from K.K. Neosu; trade name: FUTARGENT FT-300)

Comparative Example 1

451 g of spherical fine silica particles having an average particle diameter of 0.12 μm were obtained in the same manner as in Example 1 except that the step 3 in Example 1, i.e., the step of trimethylsilylating the fine silica particles by the use of hexamethyldisilazane was omitted. Using the spherical fine silica particles thus obtained, evaluation was made in the same manner as in Example 1. The results are shown in Table 2.

Comparative Example 2

468 g of spherical fine silica particles having an average particle diameter of 0.12 μm were obtained in the same manner as in Example 1 except that in the step 1 in Example 1 a mixture of 1,000 g of water and 1,000 g of methyl isobutyl ketone was used in place of 1,200 g of the water. Using the spherical fine silica particles thus obtained, evaluation was made in the same manner as in Example 1. The results are shown in Table 2.

Comparative Examples 3 to 5

Evaluation was made in the same manner as in Example 1 except that as the treating agent for spherical hydrophobic fine silica particles in Example 1 the following treating agents were used in place of the benzyltriethylammonium chloride (treating agent A). The results are shown in Table 1.

Treating agent L: Dibutylaminopropyltrimethoxysilane
Treating agent M: Betaine
Treating agent N: Stearyl dimethylbetaine

Comparative Example 6

Evaluation was made in the same manner as in Example 1 except that NIPSIL SS50F (available from Nippon Silica Industrial Co., Ltd.), a precipitated silica having been treated with an organosilicon compound, was used in place of the spherical hydrophobic fine silica particles used in Example 1.

Comparative Example 7

Evaluation was made in the same manner as in Example 1 except that AEROSIL R972 (available from Nippon Aerosil Co., Ltd.), a fumed silica having been treated to make hydrophobic, was used in place of the spherical hydrophobic fine silica particles used in Example 1.

Comparative Example 8

A toner was obtained in the same manner as in Example 1 except that the spherical hydrophobic fine silica particles used therein were not added. This toner was evaluated in the same manner as in Example 1.

TABLE 1

| Organic compound | Dielectric constant (F/m) | Example 1 | 2 | 3 | 4 | 5 | 6 | 7 |
|---|---|---|---|---|---|---|---|---|
| Dispersibility: | | | | | | | | |
| Aceto-nitrile | 38 | ○ | ○ | ○ | ○ | ○ | ○ | ○ |
| Methanol | 33 | ○ | ○ | ○ | ○ | ○ | ○ | ○ |
| Ethanol | 24 | ○ | ○ | ○ | ○ | ○ | ○ | ○ |
| MIBK | 13 | ○ | ○ | ○ | ○ | ○ | ○ | ○ |
| THF | 7 | ○ | ○ | ○ | ○ | ○ | ○ | ○ |
| Dioxane | 3 | ○ | ○ | ○ | ○ | ○ | ○ | ○ |
| $D_5$ | 2.5 | ○ | ○ | ○ | ○ | ○ | ○ | ○ |
| Toluene | 2.4 | ○ | ○ | ○ | ○ | ○ | ○ | ○ |
| Heptane | 1.9 | ○ | ○ | ○ | ○ | ○ | ○ | ○ |
| Primary particle percentge (%) after accelerated aggregation test: | | 100 | 86 | 57 | 100 | 100 | 100 | 100 |
| Treating agent: | | A | A | A | B | C | D | E |
| Silica charge quantity (μ C/g): | | −310 | −280 | −290 | −340 | −280 | −250 | −250 |
| Degree of aggregation of toner: | | 3 | 4 | 5 | 3 | 4 | 3 | 3 |
| Toner charge quantity (μ C/g): | High-temperature/high-humidity | −27.0 | −24.8 | −26.1 | −29.7 | −25.1 | −20.2 | −21.8 |
| | Low-temperature/low-humidity | −28.6 | −26.3 | −27.4 | −31.1 | −26.0 | −23.4 | −22.7 |
| Adhesion of toner to photoreceptor | | None | Few | Few | None | None | None | None |

| Organic compound | Dielectric constant (F/m) | Example 8 | 9 | 10 | 11 | 12 | 13 |
|---|---|---|---|---|---|---|---|
| Dispersibility: | | | | | | | |
| Aceto-nitrile | 38 | ○ | ○ | ○ | ○ | ○ | ○ |
| Methanol | 33 | ○ | ○ | ○ | ○ | ○ | ○ |
| Ethanol | 24 | ○ | ○ | ○ | ○ | ○ | ○ |
| MIBK | 13 | ○ | ○ | ○ | ○ | ○ | ○ |
| THF | 7 | ○ | ○ | ○ | ○ | ○ | ○ |
| Dioxane | 3 | ○ | ○ | ○ | ○ | ○ | ○ |
| $D_5$ | 2.5 | ○ | ○ | ○ | ○ | ○ | ○ |
| Toluene | 2.4 | ○ | ○ | ○ | ○ | ○ | ○ |
| Heptane | 1.9 | ○ | ○ | ○ | ○ | ○ | ○ |
| Primary particle percentge (%) after accelerated aggregation test: | | 100 | 100 | 100 | 100 | 100 | 100 |
| Treating agent: | | F | G | H | I | J | K |
| Silica charge quantity (μ C/g): | | −300 | −290 | −220 | −210 | −230 | −200 |
| Degree of aggregation of toner: | | 3 | 3 | 3 | 3 | 3 | 3 |
| Toner charge quantity (μ C/g): | High-temperature/high-humidity | −27.3 | −24.6 | −21.7 | −19.1 | −15.7 | −15.3 |
| | Low-temperature/low-humidity | −28.4 | −26.0 | −23.6 | −20.8 | −19.9 | −18.1 |
| Adhesion of toner to photoreceptor | | None | None | None | None | None | None |

Remarks:
MIBK: Methyl isobutyl ketone;
THF: Tetrahydrofuran;
$D_5$: decamethylcyclopentasiloxane

TABLE 2

| Organic compound | Dielectric constant (F/m) | Comparative Example 1 | 2 | 3 | 4 | 5 | 6 | 7 | 8 |
|---|---|---|---|---|---|---|---|---|---|
| Dispersibility: | | | | | | | | | |
| Acetonitrile | 38 | X | ○ | ○ | ○ | ○ | ○ | X | — |
| Methanol | 33 | X | ○ | ○ | ○ | ○ | ○ | X | — |
| Ethanol | 24 | X | ○ | ○ | ○ | ○ | ○ | X | — |
| MIBK | 13 | X | ○ | ○ | ○ | ○ | ○ | X | — |
| THF | 7 | X | ○ | ○ | ○ | ○ | ○ | X | — |
| Dioxane | 3 | X | ○ | ○ | ○ | ○ | X | X | — |
| $D_5$ | 2.5 | X | ○ | ○ | ○ | ○ | Δ | X | — |

Example 14

Preparation of External Additive (Surface-treated Fine Silica Particles)

100 g of the hydrophobic spherical fine silica particles synthesized in Example 1 were dispersed in 400 g of toluene, and thereafter 5 g of dimethylsilicone oil (having the structure wherein in the formula (IX) R's and R"'s are methyl groups, m is an integer in the range of 80 to 100 and n is 0) (treating agent O) was added and mixed. The toluene was evaporated off by heating to obtain 105 g of surface-treated fine silica particles.

An external-additive-mixed toner was prepared in the same manner as in Example 1 except for using the surface-treated fine silica particles thus obtained, and the degree of aggregation was measured in the same way. A developer was also prepared in the same manner as in Example 1, and the adhesion of toner to photoreceptor was evaluated in the same way. The results of these are shown in Table 3.

Example 15

469 g of spherical hydrophobic fine silica particles having an average particle diameter of 0.30 μm were obtained in the same manner as in Example 1 except that the temperature 35° C. for the hydrolysis of tetramethoxysilane in synthesizing the spherical hydrophobic fine silica particles was changed to 20° C. The spherical hydrophobic fine silica particles thus obtained were surface-treated with dimethylsilicone in the same manner as in Example 14. Using the surface-treated fine silica particles thus obtained, evaluation was made in same The results are shown in Table 3.

Example 16

469 g of spherical hydrophobic fine silica particles having an average particle diameter of 0.09 μm were obtained in the same manner as in Example 1 except that the temperature 35° C. for the hydrolysis of tetramethoxysilane in synthesizing the spherical hydrophobic fine silica particles was changed to 40° C. The spherical hydrophobic fine silica particles thus obtained were surface-treated with dimethylsilicone in the same manner as in Example 14. Using the surface-treated fine silica particles thus obtained, evaluation was made in the same manner as in Example 14. The results are shown in Table 3.

Example 17

Surface-treated fine silica particles were obtained in the same manner as in Example 14 except that the treating agent dimethylsilicone oil used therein was replaced with aminosilicone (having the structure wherein in the formula (X) R's are methyl groups, R"'s are methoxyl groups, $R^7$is a propylene group, $R^8$ is a hydrogen atom, $R^9$ is an aminoethyl group, 1 is 2, and p is 38) (treating agent P). Using the surface-treated fine silica particles thus obtained, evaluation was made in the same manner as in Example 14. The results are shown in Table 3.

Comparative Example 9

451 g of spherical fine silica particles having an average particle diameter of 0.12 μm were obtained in the same manner as in Example 14 except that the step 3 in Example 1, the step of trimethylsilylating the fine silica particles by the use of hexamethyldisilazane was omitted. The spherical fine silica particles thus obtained were surface-treated with dimethylsilicone in the same manner as in Example 14. Using the surface-treated fine silica particles thus obtained, evaluation was made in the same manner as in Example 14. The results are shown in Table 4.

Comparative Example 10

468 g of spherical fine silica particles having an average particle diameter of 0.12 μm were obtained in the same manner as in Example 1 except that in the step 1 in Example 1 a mixture of 1,000 g of water and 1,000 g of methyl isobutyl ketone was used in place of 1,200 g of the water. The spherical fine silica particles thus obtained were surface-treated with dimethylsilicone in the same manner as in Example 14. Using the surface-treated fine silica particles thus obtained, evaluation was made in the same manner as in Example 14. The results are shown in Table 4.

Comparative Example 11

Spherical hydrophobic fine silica particles were surface-treated with dimethylsilicone in the same manner as in Example 14 except that NIPSIL SS50F (available from Nippon Silica Industrial Co., Ltd.), a precipitated silica, having been treated with an organosilicon compound was used in place of the spherical hydrophobic fine silica particles synthesized in Example 1. Using the surface-treated fine silica particles thus obtained, evaluation was made in the same manner as in Example 14. The results are shown in Table 4.

Comparative Example 12

Spherical hydrophobic fine silica particles were surface-treated with aminosilicone in the same manner as in Example 17 except that NIPSIL SS50F (available from Nippon Silica Industrial Co., Ltd.), a precipitated silica, having been treated with an organosilicon compound was used in place of the spherical hydrophobic fine silica particles synthesized in Example 1. Using the surface-treated fine silica particles thus obtained, evaluation was made in the same manner as in Example 14. The results are shown in Table 4.

Comparative Example 13

Spherical hydrophobic fine silica particles were surface-treated with dimethylsilicone in the same manner as in Example 14 except that AEROSIL R972 (available from Nippon Aerosil Co., Ltd.), a fumed silica, having been treated to make hydrophobic was used in place of the spherical hydrophobic fine silica particles synthesized in Example 1. Using the surface-treated fine silica particles thus obtained, evaluation was made in the same manner as in Example 14. The results are shown in Table 4.

Comparative Example 14

A toner was obtained in the same manner as in Example 14 except that the surface-treated fine silica particles prepared in Example 14 were not added. This toner was evaluated in the same manner as in Example 14. The results are shown in Table 4.

TABLE 3

| | | Example | | | |
|---|---|---|---|---|---|
| | | 14 | 15 | 16 | 17 |
| Organic | Dielectric | ○ | ○ | ○ | ○ |

TABLE 3-continued

| | | Example | | | |
|---|---|---|---|---|---|
| | | 14 | 15 | 16 | 17 |
| compound | constant | | | | |
| Dispersibility: | | | | | |
| Acetonitrile | 38 | ○ | ○ | ○ | ○ |
| Methanol | 33 | ○ | ○ | ○ | ○ |
| Ethanol | 24 | ○ | ○ | ○ | ○ |
| MIBK | 13 | ○ | ○ | ○ | ○ |
| THF | 7 | ○ | ○ | ○ | ○ |
| Dioxane | 3 | ○ | ○ | ○ | ○ |
| $D_5$ | 2.5 | ○ | ○ | ○ | ○ |
| Toluene | 2.4 | ○ | ○ | ○ | ○ |
| Heptane | 1.9 | ○ | ○ | ○ | ○ |
| Primary-particle percentage (%) | | 100 | 86 | 57 | 100 |
| Treating agent: | | O | O | O | P |
| Degree of aggregation of toner: | | 3 | 4 | 6 | 3 |
| Adhesion of toner to photoreceptor | | None | None | Few | None |

Remarks:
MIBK: Methyl isobutyl ketone
THF: Tetrahydrofuran
D5: Decamethylcyclopentasiloxane
Treating agent O: Dimethylsilicone oil (having the structure wherein in the formula (IX) R's and R'''s are methyl groups, m is an integer in the range of 80 to 100 and n is 0)
Treating agent P: Aminosilicone (having the structure wherein in the formula (X )R's are methyl groups, R'''s are methoxyl groups, $R^7$ is a propylene group, $R^8$ is hydrogen atom, $R^9$ is an aminoethyl group, 1 is 2, and p is 38)

TABLE 4

| | | Comparative Example | | | | | |
|---|---|---|---|---|---|---|---|
| | | 9 | 10 | 11 | 12 | 13 | 14 |
| Organic compound Dispersibility: | Dielectric constant | X | ○ | ○ | ○ | X | — |
| Acetonitrile | 38 | X | ○ | ○ | ○ | X | — |
| Methanol | 33 | X | ○ | ○ | ○ | X | — |
| Ethanol | 24 | X | ○ | ○ | ○ | X | — |
| MIBK | 13 | X | ○ | ○ | ○ | X | — |
| THF | 7 | X | ○ | ○ | ○ | X | — |
| Dioxane | 3 | X | ○ | X | X | X | — |
| $D_5$ | 2.5 | X | ○ | Δ | Δ | X | — |
| Toluene | 2.4 | X | ○ | ○ | ○ | X | — |
| Heptane | 1.9 | X | ○ | ○ | ○ | X | — |
| Primary-particle percentage (%): | | — | 16 | 0 | 0 | — | — |
| Treating agent: | | O | O | O | P | O — | |
| Degree of aggregation of toner: | | 81 | 49 | 34 | 38 | 54 | 97 |
| Adhesion of toner to photoreceptor | | Many | Many | Many | Many | Many | Many |

As described above, the external additive for electrostatically charged image developing toner according to the present invention not only can improve the flowability, anti-caking properties, fixing performance and cleaning performance of developers, but also can bring about the effects that it does not cause any change in quality or abrasion of the photoreceptor, does not cause any adhesion of toner to the photoreceptor, and affords cleaning performance which is not affected by environmental conditions.

What is claimed is:

1. An external additive for electrostatically charged image developing toner, comprising spherical hydrophobic fine silica particles having primary particles with a particle diameter of from 0.01 to 5 μm and having been treated with a compound selected from the group consisting of a quaternary ammonium salt compound, a fluoroalkyl-group-containing betaine compound, and a fluoroalkenyl-group-containing betaine compound, said fine silica particles fulfilling the following conditions (i) and (ii):

(i) When an organic compound which is liquid at room temperature and has a dielectric constant of from 1 to 40 F/m and fine silica particles are mixed in a weight ratio of 5:1 and shaken, the fine silica particles disperse uniformly in the organic compound; and (ii) The quantity of primary particles remaining as primary particles when methanol is evaporated under heating by means of an evaporator from a dispersion prepared by dispersing the fine silica particles in methanol and thereafter the particles are held at a temperature of 100° C. for 2 hours, represents at least 20% of the quantity of primary particles originally present, wherein said hydrophobic fine silica particles have been obtained by the step (A) of introducing an $R^2SiO_{3/2}$ unit (wherein $R^2$ represents a substituted or unsubstituted monovalent hydrocarbon group having 1 to 20 carbon atoms) onto the surfaces of hydrophilic fine silica particles comprising an $SiO_2$ unit to obtain first hydrophobic fine silica particles; and the step (B) of introducing an $R^1_3SiO_{1/2}$ unit (wherein $R^1$'s may be the same or different and each represent a substituted or unsubstituted monovalent hydrocarbon group having 1 to 6 carbon atoms) onto the surfaces of the first hydrophobic fine silica particles.

2. The external additive according to claim 1, wherein said primary particles have a particle diameter of from 0.05 to 0.5 μm.

3. The external additive according to claim 1, wherein said hydrophobic fine silica particles have been treated with a quaternary ammonium salt compound, said quaternary ammonium salt compound being selected from the group consisting of a compound represented by the following general formula (VI) and a bipyridyl compound formed by dimerization of the compound of the following general formula (VII):

$$R^7R^8R^9R^{10}N^+X \quad \text{(VI)}$$

wherein $R^7$, $R^8$, $R^9$ and $R^{10}$ may be the same or different and each represent a substituted or unsubstituted monovalent hydrocarbon group having 1 to 20 carbon atoms, and X represents a monovalent anion; and (VII)

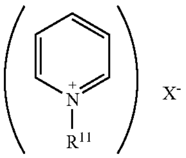

wherein $R^{11}$ may be the same or different and represents a substituted or unsubstituted monovalent hydrocarbon group having 1 to 20 carbon atoms, and X represents a monovalent anion.

4. The external additive according to claim 3, wherein the quaternary ammonium salt compound is selected from the group consisting of benzyltriethylammonium chloride, tetramethylammonium chloride, benzyltrimethylammonium chloride, benzyldimethylphenylammnonium chloride, benzyldimethyltetradecylammonium chloride, phenyltrimethylammonium chloride, benzyltriethylammonium 4-hydroxy-1-naphthalene sulfonate and 1,1'-dioctadecyl-4,4'-bipyridium dibromide.

5. The external additive according to claim 1, wherein said hydrophobic fine silica articles have been treated with a fluoroalkyl-group- or fluoroalkenyl-group- containing betaine compound, said fluoroalkyl-group or fluoroalkenyl-group- containing betaine compound being a compound represented by the following general formula (VIII):

(VIII)

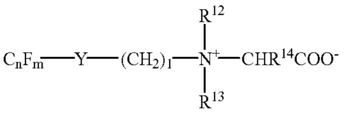

wherein $C_nF_m$— represents a fluoroalkyl group or a fluoroalkenyl group, n is an integer of 1 to 20 and m is 2n+1 or 2n−1; 1 is an integer of 0 to 10; $R^{12}$ and $R^{13}$ may be the same or different and each represent a substituted or unsubstituted monovalent hydrocarbon group having 1 to 20 carbon atoms; $R^{14}$ represents hydrogen or a substituted or unsubstituted monovalent hydrocarbon group having 1 to 10 carbon atoms; Y represents a single bond, or represents a group selected from —O—, a phenylene group, —$SO_2$—, —CO—, —$NR^{15}$ where $R^{15}$ has the same definition as $R^{14}$, or a divalent group formed by combination of two or more groups selected from these.

6. The external additive according to claim 5, wherein said betaine compound is a fluoroalkyl-group- containing betaine compound, which comprises a compound selected from the group consisting of $C_8F_{17}N^+(CH_3)_2CH_2COO^-$, $C_{10}F_{21}N^+(CH_3)_2CH_2COO^-$ and $C_{12}F_{25}N^+(CH_3)_2CH_2COO^-$.

7. A one-component developer comprising a toner with an external additive as claimed in claim 1 to the toner.

8. The one component developer according to claim 7, wherein the amount of the external additive is in a range of 0.01 to 20 parts by weight per 100 parts by weight of the toner.

9. The one component developer according to claim 8, wherein the amount of the external additive is in a range of 0.1 to 5 parts by weight per 100 parts by weight of the toner.

10. A two-component developer comprising a toner with an external additive as claimed in claim 1 and a carrier.

11. The two-component developer according to claim 10, wherein the amount of the external additive is in a range of 0.1 to 5 parts by weight per 100 parts by weight of the toner.

* * * * *